UNITED STATES PATENT OFFICE.

THOMAS W. McCUE, OF AKRON, OHIO.

ANTISEPTIC SURGICAL DRESSING.

SPECIFICATION forming part of Letters Patent No. 606,019, dated June 21, 1898.

Application filed September 30, 1895. Serial No. 564,163. (No specimens.)

*To all whom it may concern:*

Be it known that I, THOMAS W. MCCUE, a citizen of the United States, residing at Akron, in the county of Summit and State of Ohio, have invented certain new and useful Improvements in Antiseptic Compounds; and I do hereby declare the following to be a full, clear, and exact description of the invention, such as will enable others skilled in the art to which it appertains to make and use the same.

My invention relates to an inodorous composition of matter having antiseptic and curative properties and adapted to be used as a surgical dressing upon wounds and sores, particularly as a substitute for iodoform.

The invention consists in the mixture of litharge and cereal flour, with or without other ingredients, as hereinafter described and claimed.

The principal ingredient of my compound is litharge, (PbO,) which is itself a powerful and odorless antiseptic; but it is found impossible to use it alone as a surgical dressing for open wounds with good results for the following principal reasons: It has an irritating effect upon the wound, due, as I believe, to some chemical action and also to the pressure which results from its great weight. It also "cakes" upon the wound, and it is difficult for that reason to remove it preparatory to redressing the wound.

I have found after a long series of experiments that when finely-powdered litharge is mixed in substantially equal parts with the fine flour of some cereal, preferably wheat, a compound is formed which is a powerful antiseptic and germicide and may be used as a curative dressing upon the most sensitive wounds. It causes no irritation. It does not cake upon the wound. It is not only inodorous, but it is a deodorizer. It is not so heavy as to cause discomfort. It is, in a word, adapted to be used upon lacerated, contused, or incised wounds and all forms of open and suppurative sores as a substitute for the offensive iodoform or any other antiseptic dressing and in all cases with equal or better results. Although the litharge is much heavier than the flour it does not separate itself from the flour and work its way to the bottom of the containing-receptacle, as might be expected, but, on the contrary, when the two ingredients are once mixed they remain mixed.

To the compound above described may be added various other ingredients having curative, antiseptic, or cooling properties. I have found that the distinctively healing properties of the compound are increased by adding pulverized flint-clay, such as is taken from the lower wall of coal veins, and the relative quantity of such clay in the compound thus formed should be approximately fifteen to twenty per cent. I have also found that boracic acid may be added to advantage, and I have had the most thoroughly satisfactory results from the following mixture: litharge, thirty-seven and one-half per cent.; wheat-flour, thirty-seven and one-half per cent.; flint-clay, twelve and one-half per cent., and boracic acid, twelve and one-half per cent. Neither the flint-clay nor the boracic acid nor any other ingredients must necessarily be added to the mixture of litharge and flour to make a valuable antiseptic and healing compound.

Having described my invention, I claim—

1. A composition of matter consisting of a mixture of finely-powdered litharge and cereal flour, substantially as and for the purpose specified.

2. A composition of matter consisting of a mixture of finely-powdered litharge, cereal flour and flint-clay, substantially as and for the purpose specified.

3. A composition of matter consisting of a mixture of finely-powdered litharge, cereal flour, flint-clay and boracic acid, substantially as and for the purpose specified.

In testimony whereof I affix my signature in presence of two witnesses.

THOMAS W. McCUE.

Witnesses:
E. L. THURSTON,
L. F. GRISWOLD.